United States Patent
Bi

(10) Patent No.: US 7,480,639 B2
(45) Date of Patent: Jan. 20, 2009

(54) SUPPORT VECTOR CLASSIFICATION WITH BOUNDED UNCERTAINTIES IN INPUT DATA

(75) Inventor: Jinbo Bi, Exton, PA (US)

(73) Assignee: Siemens Medical Solution USA, Inc., Malvern, PA (US)

(*) Notice: Subject to any disclaimer, the term of this patent is extended or adjusted under 35 U.S.C. 154(b) by 242 days.

(21) Appl. No.: 11/141,813

(22) Filed: Jun. 1, 2005

(65) Prior Publication Data

US 2005/0273447 A1 Dec. 8, 2005

Related U.S. Application Data

(60) Provisional application No. 60/577,115, filed on Jun. 4, 2004.

(51) Int. Cl.
*G06F 15/18* (2006.01)
*G06E 1/00* (2006.01)
(52) U.S. Cl. .......................................... 706/12; 706/19
(58) Field of Classification Search ................ 706/12, 706/20, 19; 708/441, 440
See application file for complete search history.

(56) References Cited

U.S. PATENT DOCUMENTS

| 6,327,581 | B1 * | 12/2001 | Platt ............................. | 706/12 |
| RE38,269 | E * | 10/2003 | Liu ............................... | 704/227 |
| 2003/0110038 | A1 * | 6/2003 | Sharma et al. .............. | 704/270 |
| 2003/0225526 | A1 * | 12/2003 | Golub et al. ................. | 702/19 |

OTHER PUBLICATIONS

Haiyan et al., Wang; "Alternate Feature Optimization For 3-Class Underwater Target Recognition Based on SVM", IEEE, 2003.*
Song et al., Qing, "Robust Support Vector Machine With Bullet Hole Image Classification", IEEE, 2002.*
Schwenker, Friedhelm, "Hierarchical Support Vector Machines for Multi-Class Pattern Recognition", IEEE, 2000.*
Nakayama et al., Hirotaka, "Support Vector Machines Using Multi-Objective Programming and Goal", Proceedings of the 9th International Conference on Neural Information Processing, 2002.*
Haiyan et al., Wang, "Alternate Feature Optimization For 3-Class Underwater Target Recognition Based on SVM Classifiers", IEEE, 2003.*
Kanevski, Mikhail, "Evaluation of SVM Binary Classification with Nonparametric Conditional Stochastic Simulations", IDIAP, 2001.*
Chiranjib Bhattacharyya, "Robust Classification of Noisy Data Using Second Order Cone Programming Approach", *Indian Institute of Science*, ICISIP 2004, pp. 433-438.

(Continued)

*Primary Examiner*—Joseph P. Hirl
*Assistant Examiner*—Adrian L Kennedy

(57) ABSTRACT

A computer-implemented method for determining a boundary for binary classification includes providing a data set, initializing a value for noise in the data set, and determining a hyperplane dividing the data set and a slack variable given a current value for noise. The method further includes updating the value for noise and the slack variable given the hyperplane, and determining the hyperplane to be the boundary for binary classification of the data set upon determining a termination criterion to be met, wherein elements of the data set are classified according to the boundary.

13 Claims, 4 Drawing Sheets

OTHER PUBLICATIONS

Jinbo Bi et al., "Learning With Rigorous Support Vector Machines", *In Warmuth and Schoelkopf Eds. Proceedings of the 16th Annual Conference on Learning Theory*, Menlo Park, CA USA 2003, pp. 35-42.

M. Lobo et al., "Applications of Second-order Cone Programming", *Linear Algebra and Its Applications—Special Issue on Linear Algebra in Control, Signals and Image Processing, Online!*. vol. 284, Nov. 1988 pp. 193-228.

International Search Report including Notification of Transmission of the International Search Report, International Search Report, and Written Opinion of the International Searching Authority.

Jinbo Bi, et al., Learning With Rigorous Support Vector Machines, In M. Warmuth and B. Scholkopf., editors, *Proceedings of the 16th Annual Conference on Learning Theory*, pp. 35-42, Menlo Park, CA, 2003, AAAI Press.

\* cited by examiner

SUPPORT VECTOR CLASSIFICATION WITH BOUNDED UNCERTAINTIES IN INPUT DATA

This application claims priority to U.S. Provisional Application Ser. No. 60/577,115, filed on Jun. 4, 2004, which is herein incorporated by reference in its entirety.

BACKGROUND OF THE INVENTION

1. Technical Field

The present invention relates to supervised machine learning, and more particularly to system and method for supervised machine learning of binary classification models in the presence of noise.

2. Discussion of Related Art

In the field of binary classification (classifying the members of a given set of objects into two groups on the basis of whether they have some property or not), formulations of supervised learning seek a predictor that maps input x to output y. The predictor is constructed from a set of training examples $\{(x_i, y_i)\}$. A hidden underlying assumption is that errors are confined to the output y. That is, the input data are not corrupted with noise; or even when noise is present in the data, its effect is ignored in the learning formulation.

However, for many applications, this assumption is unrealistic. Sampling errors, human errors, modeling errors and instrument errors may preclude the possibility of knowing the data matrix X exactly, where $X = [x_1 \ldots x_l]^T$ consists of all training points $x_i$ as its rows. Hence the observed input $x_i$ is not accurate.

For example, consider the problem of classifying sentences from speech recognition output for call-routing applications. A speech recognition system may make errors so that the observed text is corrupted with noise. Speech recognition systems can provide an estimate of the confidence for its output, which measures how uncertain each element of its output is. This confidence information is typically ignored in learning formulations.

Therefore, a need exists for a system and method for supervised machine learning of binary classification models that models an underlying input uncertainty.

SUMMARY OF THE INVENTION

According to an embodiment of the present disclosure, a computer-implemented method for determining a boundary for binary classification includes providing a data set, initializing a value for noise in the data set, and determining a hyperplane dividing the data set and a slack variable given a current value for noise. The method further comprises updating the value for noise and the slack variable given the hyperplane, and determining the hyperplane to be the boundary for binary classification of the data set upon determining a termination criterion to be met, wherein elements of the data set are classified according to the boundary.

The method comprises determining the hyperplane dividing the data set and the slack variable given the current value for noise and updating the value for noise and the slack variable given the hyperplane are performed iteratively until the termination criteria is met. The hyperplane, slack variables are determined and the value for noise is updated according to:

$$\min_{w,b,\xi,\Delta x_i, i=1,\ldots,l} C \sum_{i=1}^{l} \xi_i + \frac{1}{2} \|w\|^2$$

$$\text{subject to} \quad y_i(w^T(x_i + \Delta x_i) + b) \geq 1 - \xi_i, i = 1, \ldots, l,$$

$$\xi_i \geq 0, i = 1, \ldots, l,$$

$$\|\Delta x_i\| \leq \delta_i, i = 1, \ldots, l.$$

The boundary is a linear boundary. The boundary is a kernel boundary.

The method further comprises providing an uncertainty estimate for a plurality of points in the data set, and modeling the uncertainty estimate as the value for noise.

According to an embodiment of the present disclosure, a linear boundary for binary classification of a data set is for binary classification of a data set according to $$\min_{w,b,\xi} \sum_{i=1}^{l} \xi_i$$

$$\text{subject to} \quad y_i(w^T x_i + b) + \gamma \delta_i \geq 1 - \xi_i, \xi_i \geq 0, i = 1, \ldots, l, \|w\|^2 \leq \gamma^2$$

wherein a plurality of elements of the data set are classified according to the linear boundary.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a learning model processes input data that is corrupted with noise. The model comprises a formulation of support vector classification based on a framework for handling uncertainty in input data. The model may be applied to fields including medical imaging, such as the heart wall motion abnormality detection, text categorization, hand-written character recognition, genetic analysis, etc.

According to an embodiment of the present disclosure, a total support vector machine (TSVM) system and method performs binary classification for applications with uncertain input data. Throughout this article, vectors are presumed to be column vectors and denoted using bold-face lower letters such as x. The transpose of a vector x is denoted as $x^T$.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
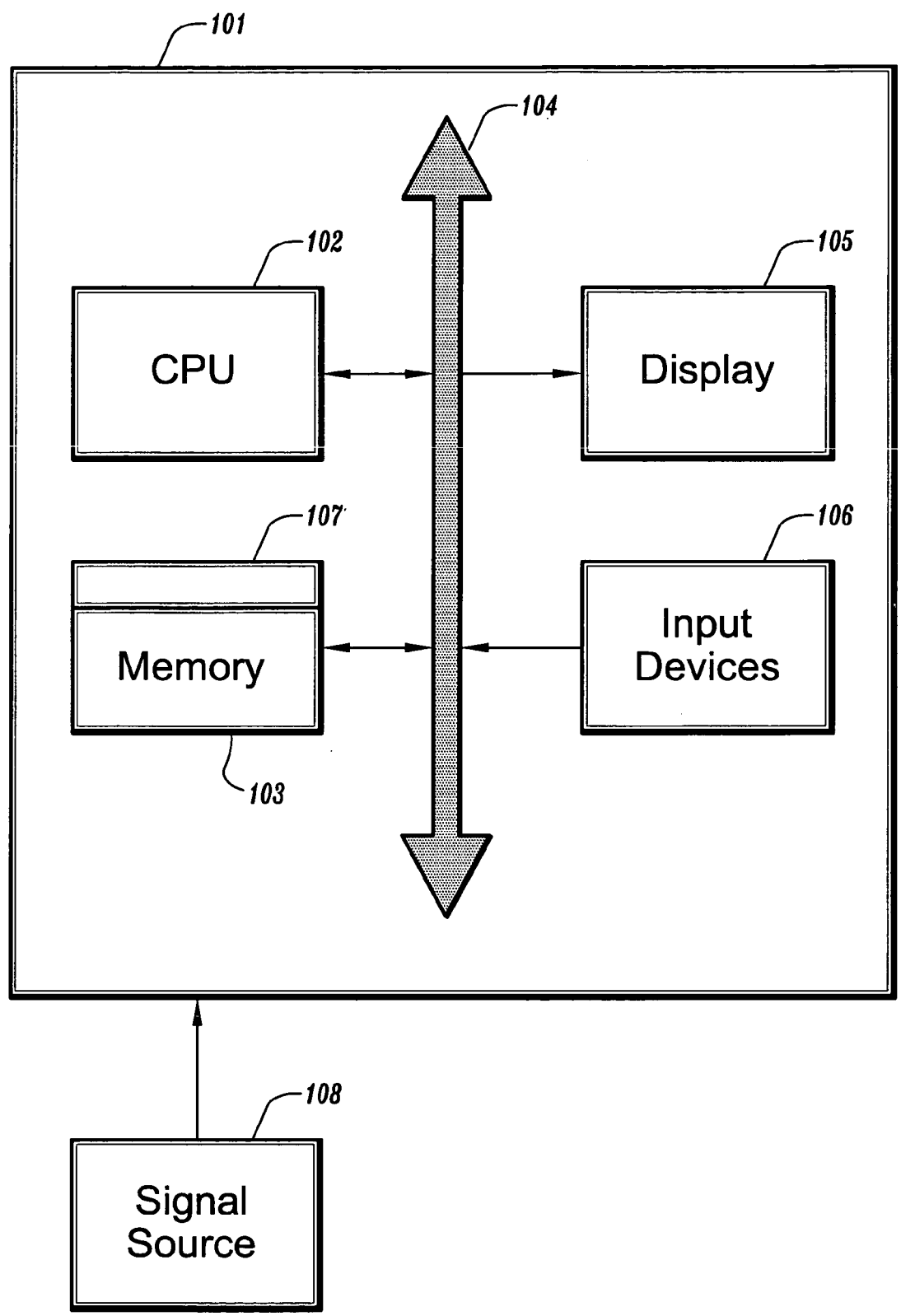
FIG. 1 is a system according to an embodiment of the present disclosure.

Referring to FIG. 1, according to an embodiment of the present disclosure, a computer system 101 for implementing a supervised machine learning method can comprise, inter alia, a central processing unit (CPU) 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Total support vector classification (TSVC): Consider an observation $(x_i, y_i)$, where $x_i$ is corrupted with noise. Denote by $x'_i$ the original uncorrupted input. Consider the following data generating process: $(x'_i, y_i)$ is generated according to a certain distribution $p(x'_i, y_i | \theta)$, where $\theta$ is a unknown parameter that needs to be estimated from the data; given $(x'_i, y_i)$, it is assumed that $x_i$ is generated from $x'_i$ (and independent of $y_i$) according to a distribution $p(x_i | \theta', \sigma_i, x'_i)$, where $\theta$ is another possibly unknown parameter, and $\sigma_i$ is a known parameter that is an estimate of the uncertainty for $x_i$. An uncertainty estimate (variance or uncertainty upper bound) of $x_i$ is assumed to be available.

For representation of data errors it is assumed that input is subject to an additive noise; $x'_i = x_i + \Delta x_i$, where noise $\Delta x_i$ follows certain distribution. For bounded uncertainties, where $\|\Delta x_i\| \leq \delta_i$ with uniform priors, the bound $\delta_i$ has a similar effect of the standard deviation $\sigma_i$ in the Gaussian noise model. Under the bounded uncertainty model, the square penalty term $(x_i - x'_i)^2 / 2\sigma_i^2$ is replaced by a constraint $\|\Delta x_i\| \leq \delta_i$.

To understand the effect of relaxing input data as in Eq.(1) and Eq.(2), note that inputs without noise are easier to predict than those corrupted with noise. Even if there is a large margin separator for the original uncorrupted inputs, the observed noisy data may become non-separable. Consequently, the observed problem is harder than the original problem.

Consider binary classification where $y_i \in \{\pm 1\}$, SVMs construct classifiers based on separating hyperplanes $\{x: w^T x + b = 0\}$. The parameters are a weight vector w and a bias b, and the predictor is $w^T x + b$. In the separable case, this leads to the following formulation:

$$\min_{w, b, \xi, \Delta x_i, i=1,\ldots,l} \frac{1}{2} \|w\|^2 \qquad (1)$$

$$\text{subject to} \quad y_i(w^T(x_i + \Delta x_i) + b) \geq 1, i = 1, \ldots, l,$$

$$\|\Delta x_i\| \leq \delta_i, i = 1, \ldots, l.$$

For non-separable problems, slack variables $\xi_i$ are introduced, one for each data point. In the resulting formulation, a square loss or a logistic loss is replaced by the margin-based hinge-loss $\xi = \max\{0, 1 - y(w^T x + b)\}$.

$$\min_{w, b, \xi, \Delta x_i, i=1,\ldots,l} C \sum_{i=1}^{l} \xi_i + \frac{1}{2} \|w\|^2 \qquad (2)$$

$$\text{subject to} \quad y_i(w^T(x_i + \Delta x_i) + b) \geq 1 - \xi_i, i = 1, \ldots, l,$$

$$\xi_i \geq 0, i = 1, \ldots, l,$$

$$\|\Delta x_i\| \leq \delta_i, i = 1, \ldots, l.$$

Note that the Tikhonov regularization term $\frac{1}{2}\|w\|_2^2$ is introduced. The effect is similar to a Gaussian prior on model parameters with the Bayesian MAP (maximum a posterior) estimator. One can regard Eq.(2) as a regularized instance with a non-probabilistic SVM discriminative loss criterion.

According to an embodiment of the present disclosure, by modifying the noisy input data, a problem is determined for which a desirable linear separator can be determined. Moreover, by modeling noise in the input data as in Eq.(2), data points that are very uncertain are substantially ignores (since a large $\Delta x_i$ is found such that $x_i + \Delta x_i$ is correctly classified no matter what w is), while considering the more trust-worthy data that are less uncertain.

Geometric interpretation: For TSVM an optimal $\hat{w}$ is obtained, and an optimal $\Delta x_i$ can be represented in terms of $\hat{w}$. For example, w in Eq.(2) is fixed, Eq.(2) becomes equivalent to minimizing $\Sigma \xi_i$ over $\Delta x_i$.

Lemma 1. For any given hyperplane (w,b), $\min_{\|\Delta x_i\| \leq \delta_i, i=1,\ldots,l} \Sigma \xi_i = \Sigma \hat{\xi}_i$ where $\hat{\xi}_i = \max\{0, 1 - y_i(w^T x_i + b) - \delta_i \|w\|\}$ and the optimal $\Delta \hat{x}_i = y_i \delta_i w / \|w\|, i = 1, \ldots, l$.

Proof. Since $\Delta x_i$ only affects $\xi_i$ and does not have impact on other slack variables $\xi_j, j \neq i$. The optimization can be decoupled to minimizing each $\xi_i = \max\{0, 1 - y_i(w^T(x_i + \Delta x_i) + b)\} = \max\{0, 1 - y_i(w^T x_i + b) - y_i w^T \Delta x_i\}$ over the corresponding $\Delta x_i$. By Cauchy-Schwarz inequality: $|y_i w^T \Delta x_i| \leq \|w\| \cdot \|\Delta x_i\|$. Let $\Delta x_i = y_i \delta_i w / \|w\|$, the equality sign of the above inequality holds, and the minimal $\xi_i = \max\{0, 1 - y_i(w^T x_i + b) - \delta_i \|w\|\}$.

Define $S_w(X) = \{x_i + y_i \delta_i w / \|w\|, i = 1, \ldots, l\}$. Then $S_w(X)$ is a set of points that are obtained by shifting the original points labeled +1 along w and points labeled −1 along −w, respectively, to its individual uncertainty boundary. This set of points is illustrated in FIG. 2B as filled points.

Figure 2C:
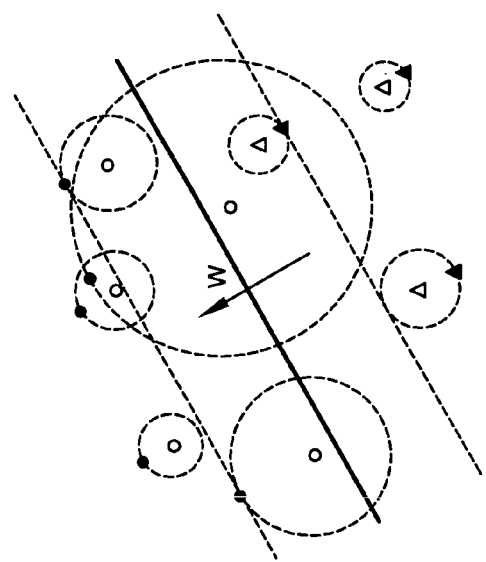
FIG. 2C is a graph illustrating that outliers with large noise can have less impact on results by TSVC according to an embodiment of the present disclosure.
Figure 2B:
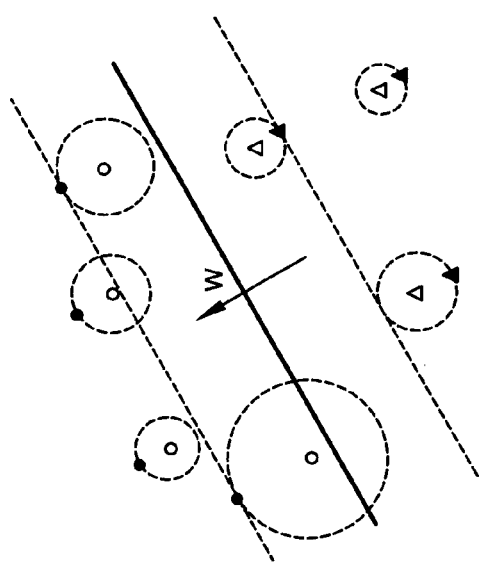
FIG. 2B is a graph of separating hyperplanes obtained by TSVC according to an embodiment of the present disclosure.
Figure 2A:
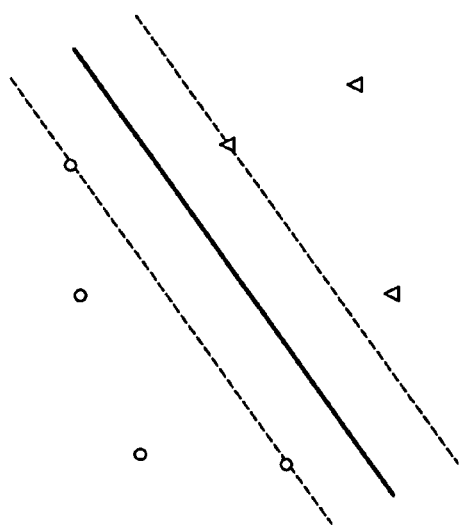
FIG. 2A is a graph of separating hyperplanes obtained by SVC.

FIGS. 2A-C illustrate the separating hyperplanes obtained by SVC (FIG. 2A) and by TSVC (e.g., Eq.(2)) (FIG. 2B). The margin can be magnified by taking into account uncertainties. FIG. 2C shows outliers with large noise can have less impact on results by TSVC.

Theorem 1. Solving Eq.(2) yields a separating hyperplane (w,b) that is the same solution by solving the following problem: find w such that the hyperplane (w,b) separates $S_w(X)$ with the maximal margin if $S_w(X)$ is linearly separable or with the maximal soft margin if $S_w(X)$ is linearly non-separable.

Proof. 1. If there exist any w such that $S_w(X)$ is linearly separable, solve Eq.(1) to obtain the largest separation margin. Let $\hat{w}, \Delta\hat{x}_i$ be optimal to Eq.(1). It is equivalent to max $\rho$ with constraints $y_i(w^T(x_i+\Delta x_i)+b) \geq \rho$ and $\|w\|=1$ and the optimal $\rho=1/\|w\|$. To have the greatest $\rho$, maximize $y_i(w^T(x_i+\Delta x_i)+b)$ for all i. Hence $\Delta x_i = y_i \delta_i w/\|w\|$ since $y_i w^T \Delta x_i \leq \|w\| \|\Delta x_i\| = \delta_i \|w\|$ and when $\Delta\hat{x}_i = y_i \delta_i w/\|w\|$, the "equal" sign holds.

2. If no w exists to make $S_w(X)$ separable or even such a w exists, choose C to achieve the best compromise between the training error and margin size, and solve Eq.(2). By Lemma 1, the optimal $\Delta\hat{x}_i = y_i \delta_i w/\|w\|$.

Based on analysis in the above points, Eq.(1) and Eq.(2) are converted to a problem in variable w,b,ξ, as opposed to optimizing over both (w,b) and $\Delta x_i, i=1,\ldots l$ $$\min_{w,b,\xi} \quad C\sum_{i=1}^{l} \xi_i + \frac{1}{2}\|w\|^2 \qquad (3)$$

$$\text{subject to} \quad y_i(w^T x_i + b) + \delta_i \|w\| \geq 1 - \xi_i, i = 1, \ldots, l,$$

$$\xi_i \geq 0, i = 1, \ldots, l.$$

Solving Eq.(3) produces an optimal solution to Eq.(2), and Eq.(3) can be interpreted as finding (w,b) to separate $S_w(X)$ with the maximal soft margin. The similar argument holds true for the linearly separable case.

Solving and kernelizing TSVC: The TSVM problem in Eq.(2) can be recast to a second-order cone program (SOCP), similar to Total Least Square or Robust Least Square. However, directly implementing SOCP can be computationally expensive. According to an embodiment of the present disclosure, an alternating optimization method is implemented.

Figure 4:
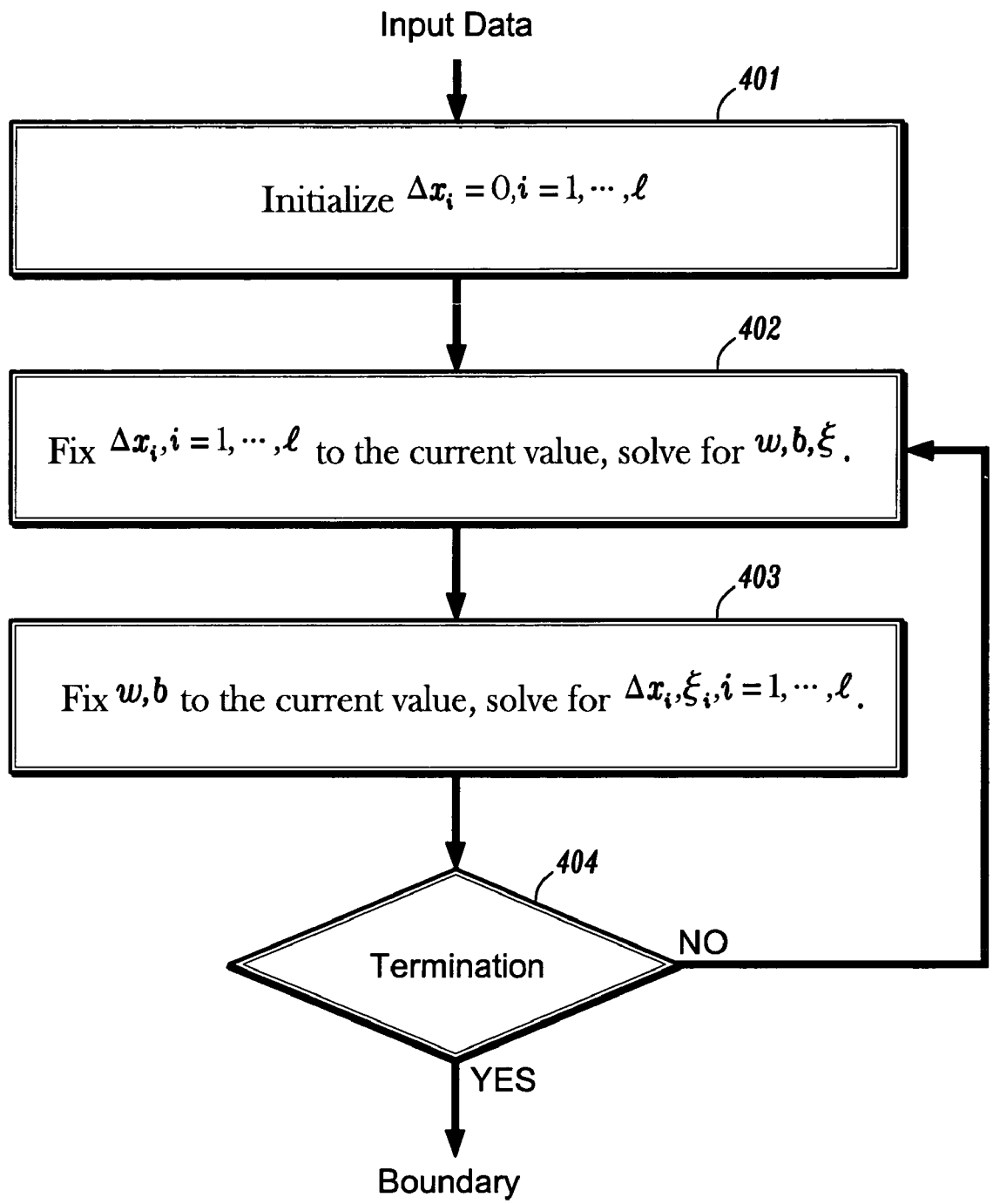
FIG. 4 is a flow chart of a method according to an embodiment of the present disclosure.

Referring to FIG. 4, a method for boundary detection for TSVC with linear or kernel applications can be described as follows: initialize $\Delta x_i=0, i=1,\ldots l$ (401). Fix $\Delta x_i, i=1,\ldots l$ to the current value, solve Eq.(2) for w,b,ξ (402). Fix w,b to the current value, solve Eq.(2) for $\Delta x_i, \xi_i, i=1,\ldots, l$ (403). Repeat blocks 402 and 403 until a termination criterion is met 404. The termination criterion is provided, for example, terminating the iteration when a desired value for ξ is obtained, e.g., 0.001. The termination criteria balances speed and accuracy.

TSVC with linear functions: Tikhonov regularization min $C\Sigma\xi_i + \frac{1}{2}\|w\|^2$ has an important equivalent formulation as min $\Sigma\xi_i$, subject to $\|w\| \leq \gamma$ where $\gamma$ is a positive constant.

It can be shown that if $\gamma \leq \|w^*\|$ where the $w^*$ is the solution to problem (2) with $\frac{1}{2}\|w\|^2$ removed, then the solution for the constraint problem is identical to the solution for the problem with Tikhonov regularization for an appropriately chosen C. Further, at optimality, the constraint $\|w\| \leq \gamma$ is active, which means $\|\hat{w}\|=\gamma$, and the TSVM problem (3) can be converted to a SOCP with the constant $\|w\| \leq \gamma$ or a quadratically constrained quadratic program if equivalently using $\|w\|^2 \leq \gamma^2$.

$$\min_{w,b,\xi} \quad C\sum_{i=1}^{l} \xi_i \qquad (4)$$

$$\text{subject to} \quad y_i(w^T x_i + b) + \gamma\delta_i \geq 1 - \xi_i, \xi_i \geq 0, i = 1, \ldots, l, \|w\|^2 \leq \gamma^2.$$

This quadratically constrained quadratic program produces the same result as Eq.(2) while having fewer variables to optimize over than SOCP. By duality analysis, Eq.(4) has a dual formulation in dual variables α as follows:

$$\min_{\alpha} \quad \gamma\sqrt{\sum_{i,j=1}^{l} \alpha_i \alpha_j y_i y_j x_i^T x_j} - \sum_{i=1}^{l}(1-\gamma\delta_i)\alpha_i \qquad (5)$$

$$\text{subject to} \quad \sum_{i=1}^{l} \alpha_i y_i = 0, 0 \leq \alpha_i \leq 1, i = 1, \ldots, l.$$

TSVC boundary detection with linear equations can be implemented directly with Eq.(4) or Eq.(5) without implementing the iterative method of FIG. 4.

TSVC boundary detection with kernels (e.g., determining a curved boundary): By using a kernel k, original input vectors $x_i$ are mapped to a high dimensional feature space. The uncertainty sphere defined by $\|\Delta x_i\| \leq \delta_i$ for $x_i$ is mapped to a compact set around the image of $x_i$ in the feature space assuming the mapping operator induced by k is continuous. Then TSVM constructs separating hyperplanes using the images of input vectors and the image regions of uncertainties. The geometric interpretation can be similarly derived as for geometric interpretations given above, where the uncertainty region may have an irregular shape in the feature space. The method of FIG. 4 and a first order Taylor expansion of k can be implemented for TSVC with kernels.

A kernel function k(z,x) takes two arguments z and x. One of the arguments is fixed, for example z,k can be viewed as a function of the other arguments x. The first order Taylor expansion of k with respect to x is $k(x_i+x,\cdot)=k(x_i,\cdot)+\Delta x^T k'(x_i,\cdot)$ where $k'(x,\cdot)$ is the gradient of k with respect to x. Block 401 of FIG. 4 is equivalent to a SVM by treating $x_i+\Delta\bar{x}_i$ as the training examples. The SVM dual formulation is optimized to obtain a solution $\bar{w}=\Sigma y_j \bar{\alpha}_j \Phi(x_j+\Delta\bar{x}_j)$. w is set to $\bar{w}$ and $\Sigma\xi_i$ is minimized over $\Delta x_i$, which amounts to max $y_i(\Sigma y_j \bar{\alpha}_j k(x_i+\Delta x_i, x_j+\Delta\bar{x}_j)+b)$ over $\Delta x_i$. Applying the Taylor expansion yields $$\max y_i(\Sigma y_j \bar{\alpha}_j k(x_i, x_j+\Delta\bar{x}_j)+\Delta x_i^T k'(x_i, x_j+\Delta\bar{x}_j)+b) = \max y_i(\Sigma y_j \bar{\alpha}_j k(x_i, x_j+\Delta\bar{x}_j)+b)+\Delta x_i^T \Sigma y_j \bar{\alpha}_j k'(x_i, x_j+\Delta\bar{x}_j).$$

The optimal $\Delta x_i = y_i \delta_i v/\|v\|$ where $v=\Sigma y_j \bar{\alpha}_j k'(x_i, x_j+\Delta\bar{x}_j)$ by applying Cauchy-Schwarz inequality. A close-form approximate solution for max $y_i(\Sigma y_j \bar{\alpha}_j k(x_i+\Delta x_i, x_j+\Delta\bar{x}_j)+b)$ over $\Delta x_i$ is thus achieved.

Experiments: Two sets of experiments were carried out, one on synthetic datasets, and the other on NIST handwritten digits, to validate the proposed TSVC algorithm. The commercial optimization package ILOG CPLEX 9.0 was used to solve Eq.(4) and the SVC dual problem as part of block 401.

In the experiments with synthetic data in 2 dimensional space, l(=20, 30, 50, 100, 150) are generated training examples $x_i$ from a uniform distribution on [−5, 5]×[−5, 5]. Experiments with TSVC were conducted using linear functions and TSVC using the quadratic kernel $(x_i^T x_j)^2$. The target separating boundary functions were $X_1-X_2=0$ and $X_1^2+X_2^2=9$, respectively. The input vectors $x_i$ were contaminated by "truncated" Gaussian noise with mean [0,0] and covariance matrix $\Sigma=\sigma_i I$ where $\sigma_i$ was randomly chosen from [0.1, 0.8]. The matrix I denotes the 2×2 identity matrix. "Truncated" means if the randomly-generated noise value was larger than $\sigma_i$, the randomly-generated noise value was set to $\sigma_i$. To produce the outlier effect, 0.1 l examples were randomly chosen from the first 0.2 l examples after examples were ordered in an ascending order of their distances to the decision boundary. For these 0.1 l examples, noise was generated using a larger $\sigma$ that was randomly drawn from [0.5, 2] for each example. Then 10000 test examples were produced from the same distribution and the target functions but without contamination. Models obtained by the SVC and TSVC were tested on the test data. 50 trials were performed for each experimental setting. The misclassification error rates averaged over the 50 trials are reported in Table 1. Two representative modeling results of l=50 are also visually depicted in FIGS. 3A-B.

TABLE 1

Average test error percentages of TSVC and SVC algorithms on problems with (FIG. 3A) the linear target and (FIG. 3B) the quadratic target.

|  | Synthetic linear target | | | | | Synthetic quadratic target | | | | | Digits | |
| --- | --- | --- | --- | --- | --- | --- | --- | --- | --- | --- | --- | --- |
| l | 20 | 30 | 50 | 100 | 150 | 20 | 30 | 50 | 100 | 150 | 100 | 500 |
| SVC | 8.9 | 7.8 | 5.5 | 2.9 | 2.1 | 9.9 | 7.5 | 6.7 | 3.2 | 2.8 | 24.35 | 18.91 |
| TSVC | 6.1 | 5.2 | 3.8 | 2.1 | 1.6 | 7.9 | 6.1 | 4.4 | 2.8 | 2.4 | 23.00 | 16.10 |

Figure 3A:
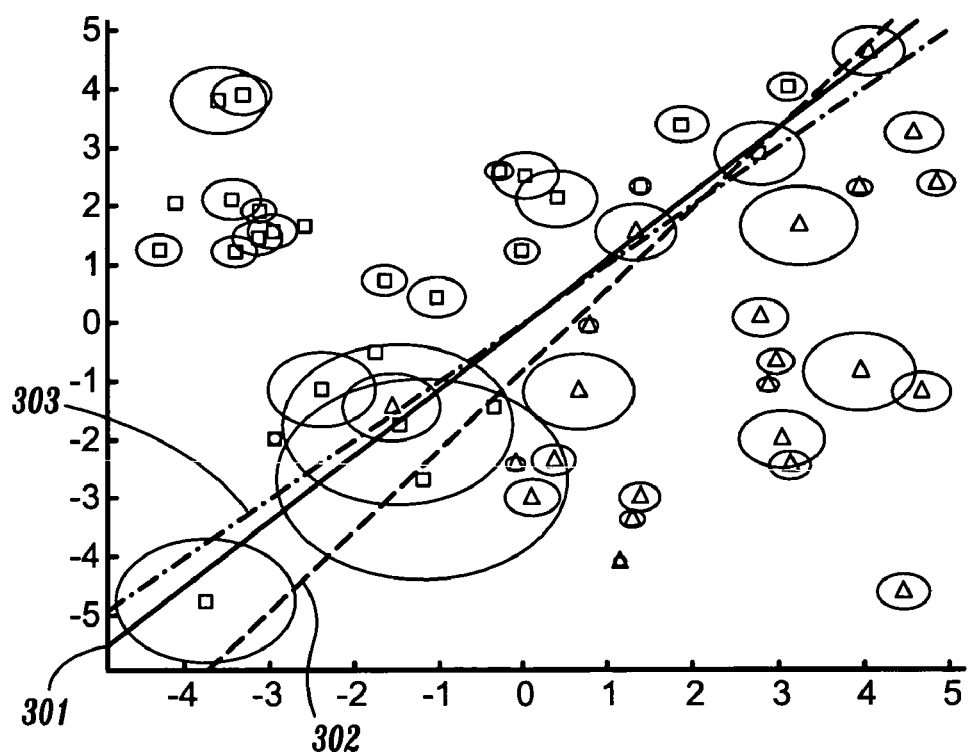
FIGS. 3A-B is a graph of comparing results obtained by TSVC and SVC and illustrating true target functions according to an embodiment of the present disclosure.
Figure 3B:
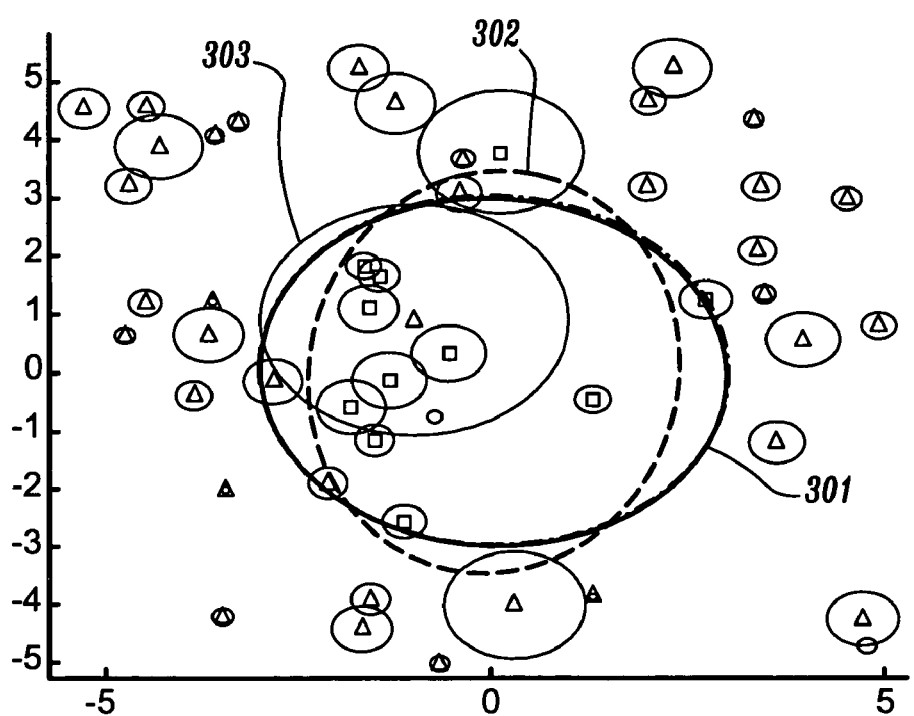

FIGS. 3A-B illustrate results obtained by TSVC (301) and standard SVC (302) for the problem with (FIG. 2A) a linear target function and the problem with (FIG. 2B) a quadratic target function. The true target functions are denoted by reference 303.

In the experiments with NIST handwritten digits, 500 digits were taken from the beginning of the database as a training set and 2000 digits from the end of the database in test. The test discriminated between odd numbers and even numbers. The training data were corrupted with a rotation operation. The angle of rotation for each digit is randomly chosen from 3° to 8°. Small rotation will not generate outliers. For example, if digit 4 is rotated counter-clockwise 5°, the corrupted image may still a good sample for digit 4. 10% of training images were chosen and rotated with a degree randomly drawn from [20°,70°]. The original training data was preprocessed by normalizing each attribute to have mean 0 and standard deviation 1. To be consistent for comparison, the test data and corrupted training data were normalized using the mean and standard deviation calculated on original training data. Then the upper bound for uncertainty of each image was estimated by calculating $\|x_i x_i^{rotated}\|$. 50 trials were performed. TSVC and SVC reported average test error rates of 21.8% and 24.1% respectively.

A TSVC learning model in which the observed input is corrupted with noise performs a binary classification, wherein input uncertainty is taken into consideration.

Having described embodiments for a system and method for supervised machine learning of binary classification models, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for determining a boundary for binary classification comprising:

providing a data set of vectors corrupted by noise;

initializing a value for uncertainty for each vector in the data set corrupted by noise;

determining a hyperplane dividing the data set and a slack variable for each vector in the data set given a current value for uncertainty, wherein a weight of each vector on the hyperplane is varied according to the current value for uncertainty for the respective vector and wherein the weight of a respective vector is reduced with increased uncertainty;

updating the value for uncertainty and the slack variable for each vector in the data set given the hyperplane; and determining the hyperplane to be the boundary for binary classification of the data set upon determining a termination criterion to be met, wherein the vectors of the data set are classified according to the boundary.

2. The computer-implemented method of claim 1, wherein determining the hyperplane dividing the data set and the slack variable given the current value for noise and updating the value for noise and the slack variable given the hyperplane are performed iteratively until the termination criteria is met.

3. The computer-implemented method of claim 2, wherein the hyperplane, slack variables are determined and the value for noise is updated according to:

$$\min_{w,b,\xi,\Delta x_i, i=1,\ldots,l} C\sum_{i=1}^{l} \xi_i + \frac{1}{2}\|w\|^2$$

subject to $y_i(w^T(x_i + \Delta x_i) + b) \geq 1 - \xi_i, i = 1, \ldots, l,$ $\xi_i \geq 0, i = 1, \ldots, l,$ $\|\Delta x_i\| \leq \delta_i, i = 1, \ldots, l.$ 4. The computer-implemented method of claim 1, wherein the boundary is a linear boundary.

5. The computer-implemented method of claim 1, wherein the boundary is a kernel boundary.

6. The computer-implemented method of claim 1, further comprising:

providing an uncertainty estimate for a plurality of points in the data set; and modeling the uncertainty estimate as the value for noise.

7. A computer-implemented method for binary classification comprising determining a linear boundary for binary classification of a data set according to $$\min_{w,b,\xi} \sum_{i=1}^{l} \xi_i$$

subject to $y_i(w^T x_i + b) + \gamma \delta_i \geq 1 - \xi_i, \xi_i \geq 0, i = 1, \ldots, l, \|w\|^2 \leq \gamma^2$ wherein a plurality of elements of the data set are classified according to the linear boundary, wherein l is a predetermined number of training examples;

$(x_i, y_i)$ is an observation where an input $x_i$ is corrupted with noise and $y_i$ is an output;

(w,b) is the linear boundary where w is a weight vector and b is a bias;

$\xi_i$ are slack variables, wherein each slack variable corresponds to a data point of the data set;

$w^T x + b$ is a predictor mapping $x_i$ to $y_i$;

$\delta_i$ is a bound corresponding to uncertainty in the input due to the noise; and $\|w\|^2 \leq \gamma^2$ is a quadratic constraint.

8. A program storage device readable by machine, tangibly embodying a program of instructions executable by the machine to perform method steps for determining a boundary for binary classification, the method steps comprising:

providing a data set of vectors corrupted by noise;

initializing a value for uncertainty for each vector in the data set corrupted by noise;

determining a hyperplane dividing the data set and a slack variable for each vector in the data set given a current value for uncertainty, wherein a weight of each vector on the hyperplane is varied according to the current value for uncertainty for the respective vector and wherein the weight of a respective vector is reduced with increased uncertainty;

updating the value for uncertainty and the slack variable for each vector in the data set given the hyperplane; and determining the hyperplane to be the boundary for binary classification of the data set upon determining a termination criterion to be met, wherein the vector of the data set are classified according to the boundary.

9. The method of claim 8, wherein determining the hyperplane dividing the data set and the slack variable given the current value for noise and updating the value for noise and the slack variable given the hyperplane are performed iteratively until the termination criteria is met.

10. The method of claim 9, wherein the hyperplane, slack variables are determined and the value for noise is updated according to:

$$\min_{w,b,\xi,\Delta x_i, i=1,\ldots,l} C \sum_{i=1}^{l} \xi_i + \frac{1}{2}\|w\|^2$$

subject to $y_i(w^T(x_i + \Delta x_i) + b) \geq 1 - \xi_i, i = 1, \ldots, l,$ $\xi_i \geq 0, i = 1, \ldots, l,$ $\|\Delta x_i\| \leq \delta_i, i = 1, \ldots, l.$ 11. The method of claim 8, wherein the boundary is a linear boundary.

12. The method of claim 8, wherein the boundary is a kernel boundary.

13. The method of claim 8, further comprising:

providing an uncertainty estimate for a plurality of point, in the data set; and modeling the uncertainty estimate as the value for noise.

* * * * *